United States Patent [19]

Flores et al.

[11] Patent Number: 4,463,122

[45] Date of Patent: Jul. 31, 1984

[54] METHOD FOR REDUCING BLOCK OF ETHYLENE INTERPOLYMERS CONTAINING —COOH GROUPS

[75] Inventors: David P. Flores; James A. Allen, both of Lake Jackson, Tex.

[73] Assignee: The Dow Chemical Company, Midland, Mich.

[21] Appl. No.: 423,960

[22] Filed: Sep. 27, 1982

Related U.S. Application Data

[62] Division of Ser. No. 332,435, Dec. 21, 1981.

[51] Int. Cl.$^3$ ............................................. C08K 5/09
[52] U.S. Cl. .................................... 524/322; 524/300;
524/400; 524/556; 524/394; 525/366
[58] Field of Search ............... 524/205, 400, 239, 300,
524/322, 394, 556; 525/366; 523/205

[56] References Cited

U.S. PATENT DOCUMENTS

| | | | |
|---|---|---|---|
| 2,084,386 | 6/1937 | Crawford | 524/300 |
| 3,472,825 | 10/1969 | Walter et al. | 526/240 |
| 3,803,065 | 4/1974 | Arai et al. | 524/322 |
| 3,806,358 | 4/1974 | Glander et al. | 524/100 |
| 3,974,111 | 8/1976 | Lochmann et al. | 526/320 |
| 4,042,766 | 8/1977 | Tatsukanu et al. | 525/370 |
| 4,104,216 | 8/1978 | Clampitt | 524/300 |

FOREIGN PATENT DOCUMENTS 1544838  11/1969  Fed. Rep. of Germany ...... 524/322

Primary Examiner—Joseph L. Schofer
Assistant Examiner—N. Sarofim
Attorney, Agent, or Firm—J. G. Carter

[57] ABSTRACT

The blocking characteristics of ethylene interpolymers containing —COOH groups are reduced by treating such polymers with a solution of an inorganic compound of a Group I-A metal such as trisodium phosphate and an organic compound of a Group I-A metal such as sodium acetate or a combination thereof.

5 Claims, No Drawings

METHOD FOR REDUCING BLOCK OF ETHYLENE INTERPOLYMERS CONTAINING —COOH GROUPS

CROSS-REFERENCE TO RELATED APPLICATION

This is a divisional of application Ser. No. 332,435, filed Dec. 21, 1981.

BACKGROUND OF THE INVENTION

The present invention concerns the treatment of particulate interpolymers of ethylene having pendant carboxyl groups.

Particles of ethylene interpolymers having pendant carboxyl groups tend to stick together or cohere during storage, particularly in a warm environment. This is particularly present when the amount of monomer or monomers containing the carboxyl group is present in the polymer in amounts of 10% by weight and above. These polymers tend to bridge together in handling systems, during shipping, storage, and in fabricating equipment lines due to the tendency to stick and block, particularly when such polymers are in the form of pellets or chips. This results in an economic loss, in terms of slow downs, to physically unblock the storage bins and sometimes in shutdowns of production lines.

G. R. Looney et al. in U.S. Pat. No. 3,753,965 discloses a method for deblocking particles of the polymers containing ethylene and acrylic acid by treating such polymers in a solution of a base material.

It may be desirable to perform the treatment step simultaneously while chopping strands of the polymer into pellets or the like.

The present invention provides alternate treatment solutions which, in some instances, are superior to those employed by Looney. Also, the treatment solutions of the present invention do not, in most instances, significantly adversely affect the physical properties of the polymer.

SUMMARY OF THE INVENTION

The present invention pertains to a method for surface treating particles of an interpolymer of ethylene and a polymerizable ethylenically unsaturated monomer containing carboxyl groups, said interpolymer containing up to about 50, preferably from about 10 to about 40, weight percent of carboxyl group containing monomer so as to reduce the tendency of such polymer to block and stick, which process comprises contacting such particles with a member selected from the group consisting of (A) a solution containing from about 0.1 weight percent to that which provides a saturated solution, preferably from about 0.125 to about 1.5 weight percent of a carboxylic acid salt represented by the general formula

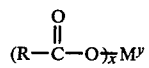

wherein R is a hydrocarbon or hydroxyl-substituted hydrocarbon group; M is a y valent metal selected from Groups I-A or II-A of the Periodic Table; and wherein x=y and each have a value of from 1 to 2 inclusive;

(B) a solution containing from about 0.1 weight percent to that which provides a saturated solution, preferably from about 0.125 to about 1.5 weight percent of a carboxylic acid having the general formula

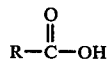

wherein R is as defined in (A) above;
(C) a solution containing
  (1) from about 0.10 to about 5, preferably from about 0.125 to about 0.75, weight percent of a member of the group represented by (A) and
  (2) from about 0.10 to about 5, preferably from about 0.125 to about 0.75, percent by weight of the group represented by (B);
(D) a solution containing
  (1) from about 0.10 to about 5, preferably from about 0.125 to about 0.75, weight percent of an inorganic metal salt represented by the general formula $M_aY_b$ wherein M is a metal from Groups I-A or II-A of the Periodic Table, Y is a carbonate, sulfate, phosphate, nitrate or bicarbonate group, and a and b have values such that will balance the general formula and
  (2) from about 0.10 to about 5, preferably from about 0.125 to about 0.75, weight percent of a member of the group represented by (A);
(E) a solution containing
  (1) from about 0.10 to about 5, preferably from about 0.125 to about 0.75 weight percent of a member of the group represented by (D-1) and
  (2) from about 0.10 to about 5, preferably from about 0.125 to about 0.75 weight percent of a member of the group represented by (B); and
(F) a solution containing
  (1) from about 0.10 to about 5, preferably from about 0.125 to about 0.75, weight percent of a tertiary organic amine represented by the general formula

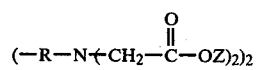

wherein R is as defined in (A) above and each Z is independently hydrogen or a monovalent metal selected from groups I-A and I-B of the Periodic Table; and
  (2) from about 0.10 to about 5, preferably from about 0.125 to about 0.75, weight percent of a member of the group represented by (D-1);

and wherein said treatment is conducted in sufficient quantities at a sufficient temperature for a sufficient time so as to provide the resultant treated particles, after drying, with reduced blocking and/or sticking properties.

The present invention also pertains to an improvement in a process for reducing the blocking and/or self-sticking characteristics of interpolymers of ethylene and one or more polymerizable ethylenically unsaturated monomers, at least one of which contains a —COOH group, by treating such polymers with a solution containing a compound of a Group I-A metal compound at a concentration, temperature and time sufficient to reduce such blocking and/or self-sticking characteristics; said improvement comprising employing as the Group I-A metal compound, a mixture comprising
(A) at least one inorganic compound of a Group I-A metal or a Group I-A or I-B metal salt of ethylenedinitrilotetraacetate and
(B) at least one organic compound of said group I-A metal.

As used herein, the term Periodic Table refers to the Periodic Table of the Elements published by Sargent-Welch Scientific Company, catalog number S-18806. The term Group refers to the group designations, columns, in that Table.

DETAILED DESCRIPTION OF THE INVENTION

Particular compounds which can be employed in the process of the present invention include, for example, solutions of mixtures of sodium benzoate and trisodium phosphate, sodium citrate and trisodium phosphate, sodium acetate and sodium carbonate, sodium benzoate and sodium carbonate, sodium citrate and sodium carbonate, sodium stearate and sodium carbonate, sodium stearate and trisodium phosphate, sodium salicylate and sodium carbonate, sodium salicylate and trisodium phosphate, sodium acetate and tetrasodium ethylenedinitrilotetraacetate and the like.

Also suitable are solutions of stearic acid, acetic acid, propanoic acid, butanoic acid, mixtures thereof and the like.

The acids and/or salts are employed as aqueous solutions or as solutions in an organic solvent such as alcohols or the like such as, for example, ethyl alcohol or isopropyl alcohol.

The particles, usually in the form of pellets or chips, are treated by contacting them with the treating solution at a temperature of from about 0° C. to about 85° C., preferably at about 15° C. to about 30° C., for from about one second to about two hours, preferably for from about five seconds to about 45 seconds. The total concentration of the solution is usually from about 0.01% to about 10%, preferably from about 0.25% to about 1.5% by weight of solute in the chosen solvent and at a solution pH of from about 2 to about 13.5.

When employing the solutions at a pH of about 10 or less, the treatment effect progresses very slowly such as to render the process economically impractical for commercial operations. However, when using solutions of carboxylic acids, adequate antiblocking is effective at lower pH values. When treating polymers containing greater than about 15 weight of a carboxylic acid containing monomer, solutions greater than about 12.5 pH are not deemed to be commercially practical over longer periods of time due to a tendency toward corrosion of the process equipment. Also, at temperatures below about 15° C. some of the treating materials are not readily soluble in the solvent. The maximum temperature employed should be below the melting point or the low end of the melting range of the polymer being treated. For most of such polymers, the upper limit on the treatment range is about 75° C.

Suitable interpolymers containing pendant —COOH groups which can be employed herein include ethylene/acrylic acid copolymers, ethylene/methacrylic acid, ethylene/acrylic acid/acrylate ester terpolymers, blends thereof and the like.

The following examples are illustrative of the present invention and are not to be construed as to limiting the scope thereof in any manner.

EXAMPLE I

Treatment

A 500 grams sample of pellets of ethylene/acrylic acid copolymer containing 20.5 weight percent acrylic acid and with a melt index of 25 was placed in a 2000 cc beaker containing 1500 cc of various previously prepared aqueous treatment solutions of a composition indicated in the following Table I. The pellets were allowed to come in contact with the treatment solution for 3 minutes at ambient temperature (23° C.±1°). The solution was drained and the treated pellets were spread onto an aluminum sheet and placed in a forced-draft oven and dried for 30 minutes at 50° C. The pellets were removed from the oven after 30 minutes and allowed to cool for 15 minutes to room temperature (23° C.±1°) before being tested.

Blocking or Sticking Test

Samples treated were tested by the following procedures:

MELT INDEX
ASTM D1238, condition (B).

RIGIDITY
ASTM D747 pH
Standard pH determination procedures were used, using a Leeds Northrup pH meter model 7411.

Na PICK-UP
The resin is partially dry ashed in a platinum crucible followed by complete ashing in a muffled furnace at 500° C. The ash is taken up in a slightly acidic solution and introduced in Spectraspan III emission spectroplotomer which utilizes DC current as the energy source. Plasma is used to excite the Na ions and emit its characteristic spectrum.

Drop Test

A test to determine the extent of pellet blocking employed a 13.2 mm inside diameter Plexiglass cylinder and a 12.7 mm outside diameter solid rod of Plexiglass, which will just fit into the cylinder. A known weight of 488 grams (to simulate the force exerted on the pellets at the bottom of a full 20 foot silo) was placed on the rod, pushing down on 3.5 grams of pellets inside the cylinder. The whole apparatus was placed in an oven at 50° C. (the estimated maximum temperature attained in silos or hopper cars). The extent of the blocking was expressed as the height in inches that the inverted cylinder had to be dropped to dislodge the pellets completely. Each copolymer sample was tested in multiplicate (6 times) and the average value was used as its blocking value. The higher the number, the worse the material blocks.

Results of various treating solutions are given in the following Table I.

TABLE I

| TREATING MATERIAL | SAMPLE NUMBER | | | |
|---|---|---|---|---|
| | A | B | C | D |
| sodium, acetate. wt. % | 0 | 0.75 | 0 | 0.375 |
| trisodium phosphate, wt. % | 0 | 0 | 0.75 | 0.375 |
| Drop Test, inches | >21 | 10 | 10.8 | 5 |

TABLE I-continued

| TREATING MATERIAL | SAMPLE NUMBER | | | |
|---|---|---|---|---|
| | A | B | C | D |
| cm. | >53.4 | 25.4 | 27.4 | 12.7 |

EXAMPLE 2

In a manner similar to Example 1, various treating solutions were employed at various concentrations to treat two different polymers. The results are given in Table II.

EXAMPLE 3

In a manner similar to Example 1, various treating solutions were employed at various concentrations. The polymer treated was an ethylene acrylic acid copolymer containing 20% acrylic acid by weight.

The polymer employed in samples A through O had a melt index of about 13.1 before treatment whereas the polymer employed in samples P through Y had a melt index of about 25 before treatment. The results are given in Table III.

TABLE II

| Polymer and Results | Sodium Acetate 0.75[4] | Sodium Benzoate 0.5[4] | Sodium Citrate 0.5[4] | Sodium Salicylate 0.5[4] | Sodium Stearate 0.5[4] | Acetic Acid 0.5[4] | Stearic Acid 1.0[4] |
|---|---|---|---|---|---|---|---|
| Polymer A[1] | | | | | | | |
| pH | 7.95 | 7.2 | 7.1 | 5.65 | 9.4 | N.D.* | N.D. |
| Drop Test | | | | | | | |
| inches | 6.8 | 9.3 | 9.5 | >10 | 4.5 | N.D. | 5.8 |
| cm | >17.3 | 23.7 | 24.1 | >25.4 | 11.4 | N.D. | 33 |
| Melt Index | 12.9 | N.D. | N.D. | N.D. | N.D. | N.D. | 13.0 |
| Rigidity | | | | | | | |
| psi | 3970 | N.D. | N.D. | N.D. | N.D. | N.D. | 3960 |
| kg/cm² | 279 | | | | | | 278 |
| Na Pick-up[2] | | | | | | | |
| ppm | N.D. | N.D. | N.D. | N.D. | N.D. | N.D. | N.D. |
| Polymer B[3] | | | | | | | |
| pH | 7.95 | 7.2 | 7.1 | 5.65 | 9.4 | N.D. | N.D. |
| Drop Test | | | | | | | |
| inches | >10 | >10 | >10 | >10 | >10 | N.D. | N.D. |
| cm | >25.4 | >25.4 | >25.4 | >25.4 | >25.4 | N.D. | N.D. |
| Polymer C[5] | | | | | | | |
| pH | N.D. | N.D. | N.D. | N.D. | N.D. | 2.8 | 5.75 |
| Drop Test | | | | | | | |
| inches | N.D. | N.D. | N.D. | N.D. | N.D. | 5.4 | 5.4 |
| cm | N.D. | N.D. | N.D. | N.D. | N.D. | 13.7 | 13.7 |
| Melt Index | N.D. | N.D. | N.D. | N.D. | N.D. | 14.9 | 19.2 |

*Not Determined
Footnotes to Table II
[1]Polymer A was an ethylene/acrylic acid copolymer containing about 20% acrylic acid by weight and having a melt index of about 13.1.
[2]Na pick-up by the polymer was obtained about 3 minutes a treatment at room temperature.
[3]Polymer B was an ethylene/acrylic acid copolymer containing about 20% acrylic acid by weight and having a melt index of about 25.
[4]Concentration in weight percent based on weight of additive plus weight of water.
[5]Polymer C was an ethylene/acrylic acid copolymer containing about 20% acrylic acid by weight and having a melt index of about 15.

TABLE III

| Treating Material and Results | SAMPLE NUMBER | | | | | | | | | | |
|---|---|---|---|---|---|---|---|---|---|---|---|
| | A | B | C | D | E | F | G | H | I | J | K |
| Treating Material[1] | | | | | | | | | | | |
| Trisodium Phosphate | 0 | 0 | 0.75 | 0.375 | 0 | 0 | 0 | 0 | 0 | 0 | 0 |
| Sodium Acetate | 0 | 0.75 | 0 | 0.375 | 0 | 0 | 0 | 0 | 0 | 0 | 0 |
| Sodium Benzoate | 0 | 0 | 0 | 0 | 0.5 | 0 | 0.25 | 0 | 0 | 0 | 0 |
| Sodium Carbonate | 0 | 0 | 0 | 0 | 0 | 0.5 | 0.25 | 0 | 0 | 0 | 0 |
| Sodium Citrate | 0 | 0 | 0 | 0 | 0 | 0 | 0 | 0 | 0 | 0 | 0 |
| Sodium Salicylate | 0 | 0 | 0 | 0 | 0 | 0 | 0 | 0.5 | 0 | 0.25 | 0 |
| Sodium Hydroxide | 0 | 0 | 0 | 0 | 0 | 0 | 0 | 0 | 0.5 | 0.25 | 0 |
| Tetrasodium Ethylene Dinitrilotetraacetate | 0 | 0 | 0 | 0 | 0 | 0 | 0 | 0 | 0 | 0 | 0.75 |
| pH | — | 7.95 | 11.5 | 11.4 | 7.2 | 11 | 10.9 | 9.7 | 12.6 | 11.7 | 10.9 |
| Results | | | | | | | | | | | |
| Melt Index[3] | 13.1 | 12.9 | N.D.[2] | 12.9 | N.D.[2] | N.D.[2] | 12.9 | N.D.[2] | N.D.[2] | 12.8 | N.D.[2] |
| Rigidity | | | | | | | | | | | |
| psi | 3850 | N.D.[2] | N.D.[2] | 4100 | N.D.[2] | N.D.[2] | 4000 | N.D.[2] | N.D.[2] | 4070 | N.D.[2] |
| kg/cm² | 271 | | | 288 | | | 281 | | | 286 | |
| Drop Test | | | | | | | | | | | |
| inches | >21 | 6.8 | 4.4 | 3.2 | 9.3 | 2.4 | 0.91 | 5.7 | 3.6 | 2.3 | 3.8 |
| cm | 53.3 | 17.3 | 11.2 | 8.1 | 13.6 | 6.1 | 2.31 | 14.5 | 9.1 | 5.8 | 9.7 |

Treating Material

TABLE III-continued

| and Results | SAMPLE NUMBER | | | | | | | | | | |
|---|---|---|---|---|---|---|---|---|---|---|---|
| | L | M | N | O | P | Q | R | S | T | U | V |
| Treating Material[1] | | | | | | | | | | | |
| Trisodium Phosphate | 0 | 0 | 0.25 | 0.25 | 0.25 | 0.375 | 0.375 | 0.375 | 0.5 | 0.5 | 0.5 |
| Sodium Acetate | 0.375 | 0 | 0.25 | 0 | 0 | 0.375 | 0 | 0 | 0.5 | 0 | 0 |
| Sodium Benzoate | 0 | 0 | 0 | 0.25 | 0 | 0 | 0.375 | 0 | 0 | 0.5 | 0 |
| Sodium Carbonate | 0 | 0 | 0 | 0 | 0 | 0 | 0 | 0 | 0 | 0 | 0 |
| Sodium Citrate | 0 | 0 | 0 | 0 | 0.25 | 0 | 0 | 0.375 | 0 | 0 | 0.5 |
| Sodium Salicylate | 0 | 0 | 0 | 0 | 0 | 0 | 0 | 0 | 0 | 0 | 0 |
| Sodium Hydroxide | 0 | 0 | 0 | 0 | 0 | 0 | 0 | 0 | 0 | 0 | 0 |
| Tetrasodium Ethylene Dinitrilotetraacetate | 0.375 | 0 | 0 | 0 | 0 | 0 | 0 | 0 | 0 | 0 | 0 |
| pH | 10.5 | — | 11.2 | 11.3 | 11.2 | 11.2 | 11.3 | 11.3 | 11.3 | 11.3 | 11.3 |
| Results | | | | | | | | | | | |
| Melt Index[3] | 12.8 | 25.0 | N.D.[2] | N.D.[2] | N.D.[2] | N.D.[2] | N.D.[2] | N.D.[2] | N.D.[2] | N.D.[2] | N.D.[2] |
| Rigidity | | | | | | | | | | | |
| psi | 4170 | N.D.[2] | N.D.[2] | N.D.[2] | N.D.[2] | N.D.[2] | N.D.[2] | N.D.[2] | N.D.[2] | N.D.[2] | N.D.[2] |
| kg/cm² | 293 | | | | | | | | | | |
| Drop Test | | | | | | | | | | | |
| inches | 2.8 | >21 | 5.6 | 6.6 | 5.5 | 5 | 6 | 5.6 | 5.1 | 6.7 | 4.7 |
| cm | 7.1 | 53.3 | 14.2 | 16.8 | 14 | 12.7 | 15.2 | 14.2 | 13 | 17 | 11.9 |

Footnotes to Table III
[1]Values expressed for the treating material are wt. % in an aqueous solution.
[2]N.D. = Not determined
[3]The melt index values are those measured after treatment except for the control samples A and M.

We claim:

1. A method for reducing the tendency for particles of an interpolymer of ethylene and a polymerizable ethylenically unsaturated monomer containing carboxyl groups to block and stick, which method comprises treating by contacting said particles with sufficient quantities of a solution containing
   (1) from about 0.10 to about 5 weight percent of a carboxylic acid salt represented by the general formula

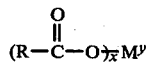

wherein R is a hydrocarbon or hydroxyl-substituted hydrocarbon group; M is a metal selected from Groups I-A or II-A of the Periodic Table; and wherein x=y and each have a value of from 1 to 2 inclusive; and
   (2) from about 0.10 to about 5 percent by weight of a carboxylic acid having the general formula

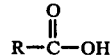

wherein R is as defined in (A) above;
   at a temperature of from about 0° C. to about 85° C. for a sufficient time so as to provide the resultant treated particles, after drying, with reduced blocking and/or sticking properties.

2. A method of claim 1 wherein component (1) contains at least one member selected from the group consisting of those compounds having as the cation, sodium, potassium, and lithium and as the anion, acetate, benzoate, citrate, salicylate, stearate, and ethylenedinitrilotetraacetate and component (2) contains at least one member selected from acetic acid, propanoic acid, butanoic acid and stearic acid.

3. A method of claim 2 wherein said cation is sodium.

4. A method of claims 1, 2, or 3 wherein said interpolymer is a copolymer of ethylene and acrylic acid containing from about 10% to about 40% acrylic acid by weight.

5. A method of claim 4 wherein said copolymer has a melt index of less than about 150.

* * * * *